(12) United States Patent
Witzens et al.

(10) Patent No.: US 7,397,987 B2
(45) Date of Patent: Jul. 8, 2008

(54) RESONANTLY ENHANCED GRATING COUPLER

(75) Inventors: Jeremy Witzens, Pasadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 53 days.

(21) Appl. No.: 11/119,380

(22) Filed: Apr. 29, 2005

(65) Prior Publication Data

US 2005/0286832 A1 Dec. 29, 2005

Related U.S. Application Data

(60) Provisional application No. 60/568,729, filed on May 6, 2004.

(51) Int. Cl.
*G02B 6/34* (2006.01)

(52) U.S. Cl. .............................. 385/37; 385/14; 385/50

(58) Field of Classification Search ........................ None
See application file for complete search history.

(56) References Cited

U.S. PATENT DOCUMENTS

| 6,958,469 | B2 * | 10/2005 | Ishizuka ................. 250/231.16 |
| 7,006,732 | B2 * | 2/2006 | Gunn et al. .................... 385/37 |
| 7,245,789 | B2 * | 7/2007 | Bates et al. ..................... 385/7 |
| 2004/0156590 | A1 | 8/2004 | Gunn, III et al. .............. 385/37 |
| 2004/0184156 | A1 | 9/2004 | Gunn, III et al. ............ 359/629 |

OTHER PUBLICATIONS

Bates, K.A., et al. "Gaussian beams from variable groooves depth grating couplers in planar waveguides", *Applied Optics*. vol. 32, No. 12 (1993).

Louderback, D.A., et al. "VCSELs with monolithic coupling to internal horizontal waveguides using integrated diffracton gratings", *Electronic Letters*, vol. 40, No. 17, pp. 1064-1065 (2004).

Miller, M., et al. "Chirped and Curved Grating Coupler Focusing Both Outgoing Beam and Guided Wave" Optics Communications, vol. 33, No. 1, pp. 13-16 (1980).

Miyanga, S., et al. "Intensity profile of outgoing beams from uniform and linearly tapered grating couplers", *Applied Optics*. vol. 20, No. 4, pp. 688-695 (1981).

Taillaert, D., et al. "Compact efficient broadband grating coupler for silicon-on-insulator waveguides", *Optics Letters*, vol. 29, No. 23, pp. 2749-2751 (2004).

Taillaert, D., et al. "A Compact Two-Dimensional Grating Coupler Used as a Polarization Splitter" *IEEE Photon Technology Letters*, vol. 15, No. 9, pp. 1249-1251 (2003).

Vuckovich, J., et al. "Design of photonic crystal microactivities for cavity QED" *Physical Review E*, vol. 65, 016608, pp. 1-11 (2001).

Witzens, J., et al. "Monolithic integration of vertical-cavity surface-emitting lasers with in-plane waveguides", *Applied Physics Letters* 86, 101105 (2005).

* cited by examiner

*Primary Examiner*—Tina M Wong
(74) *Attorney, Agent, or Firm*—Steinfl & Bruno

(57) ABSTRACT

An apparatus and method for increasing efficiency of grating couplers are disclosed. The apparatus through the use of a defect or a reflective element allows coupling of light around a normal or nearly normal angle with a high efficiency. The method disclosed teaches how to increase the efficiency of a grating coupler through the use of a defect or a mirror. The apparatus and method can be of particular utility in the context of optical clocking implemented with a III-V chip flip-chip bonded on a CMOS chip.

10 Claims, 9 Drawing Sheets

RESONANTLY ENHANCED GRATING COUPLER

CROSS-REFERENCE TO RELATED APPLICATIONS

The present application claims the benefit of U.S. provisional Patent Application Ser. No. 60/568,729, filed May 6, 2004 for "Grating Coupler with Defect Mode" by Jeremy Witzens, the disclosure of which is incorporated herein by reference.

GOVERNMENT INTEREST

The research carried out in the subject application was supported in part by grants from the Air Force Office of Scientific Research (AFOSR Program "Optical Logic with Gain" under contract N. F49620-03-1-0418) and the National Science Foundation (grant no. ECS-0335110). The U.S. Government may have rights in any patent issuing on this application.

BACKGROUND

1. Field

The present disclosure relates to grating couplers capable of coupling light around a normal or nearly normal angle with a high efficiency. In particular, it relates to a resonantly enhanced grating coupler, for example a grating coupler with defect mode.

2. Related Art

Grating couplers are usually not very efficient when coupling around a right angle because the Bragg condition to extract normally out of the waveguide also corresponds to the second order bandgap of the grating. Most of the light gets back reflected into the grating instead of being coupled out. D. Taillaert, H. Chong, P. I. Borel, L. H. Frandsen, R. M. De La Rue, and R. Baets, "A Compact Two-Dimensional Grating Coupler used as a Polarization Splitter", IEEE Photon. Technol. Lett. 15, 1249-1251 (2003) describes a polarization splitting grating coupler. D. Taillaert, P. Bienstam, and R. Baets, "Compact efficient broadband grating coupler for silicon-on-insulator waveguides", Opt. Lett. 29, 2749-2751 (2004) describes a reflector in the vertical direction to enhance efficiency. U.S. Pub. App. No. 2004/0156590 describes an optical waveguide grating coupler with curved grates. S. Miyanaga, and T. Asakura, "Intensity profile of outgoing beams from uniform and linearly tapered grating couplers", Appl. Opt. 20, 688-695 (1981) and K. A. Bates, L. Li, R. L. Roncone, and J. J. Burke, "Gaussian beams from variable groove depth grating couplers in planar waveguides", Appl. Opt. 32, 2112-2116 (1993) describe examples of varying the grate strength to tailor the emission profile. M. Miler, and M. Skalsky, "Chirped and Curved Grating Coupler Focusing Both Outgoing Beam and Guided Wave", Opt. Commun. 33, 13 (1980) describe chirped gratings and focusing in the vertical direction. D. A. Louderback, G. W. Pickrell, M. A. Fish, J. J. Hindi, H. C. Lin, M. C. Simpson, T. J. Eustis, and P. S. Guilfoyle, "VCSELs with Monolithic Coupling to Internal In-Plane Waveguides using Integrated Diffraction Gratings", Electron. Lett. 40, 1064-1065 (2004) describes an example of grating coupler placed inside a vertical cavity.

Developing a grating coupler to couple light into a waveguide through a ninety degrees bend presents a difficult design issue. One possibility is to place the horizontal waveguide and the grating coupler (etched into the waveguide) into a vertical cavity such as in the Louderback paper cited above. However, the approach in Louderback leads to complications. In particular, it necessitates a reflector both above and below the grating. For silicon-on-insulator based integrated optics fabricated with CMOS compatible processing steps there is no possibility to fabricate the top reflector (where "bottom" is where the substrate of the chip is located and "top" is above the chip).

SUMMARY

According to a first aspect, a grating coupler is provided, comprising: a first waveguide; and a first grating associated with the waveguide, the first grating comprising a first plurality of grates and a second plurality of grates separated by a first distance from the first plurality of grates, said first distance being controllable in accordance with a profile of light to be input into the waveguide or extracted from the waveguide.

According to a second aspect, a polarization splitting grating coupler is provided, comprising: a first waveguide; a second waveguide; a first grating associated with the first waveguide, the first grating comprising a first plurality of grates and a second plurality of grates separated by a first distance from the first plurality of grates; a second grating associated with the second waveguide, the second grating comprising a third plurality of grates and a fourth plurality of grates separated by a second distance from the third plurality of grates; wherein light incoming from a first direction is coupled in a second direction in either the first waveguide or the second waveguide.

According to a third aspect, an arrangement is provided, comprising: a waveguide; a first grating associated with the waveguide, the first grating having a first periodicity, the waveguide and the first grating forming a first grating coupler; and a reflective element associated with the first grating coupler.

According to a fourth aspect, a system is provided, comprising: a light source; a waveguide receiving light from the light source; a first grating associated with the waveguide; and a resonant mechanism associated with the first grating to control polarization of the light source.

According to a fifth aspect, a system is provided, comprising: a waveguide; a detector receiving light from the waveguide; a first grating associated with the waveguide; and an in-plane resonant mechanism enhancing efficiency of the system for 90 degrees bending of light.

According to a sixth aspect, a method to increase efficiency of a grating coupler is provided, comprising: providing a first grating coupler with a grating coupler periodicity; providing a resonant mechanism; and combining the first grating coupler with the resonant mechanism.

Light is coupled from an in-plane waveguide to out-of-plane, with an angular change (for example a 90 degree change) in the direction of propagation. In the 90 degree case, light propagates in the vertical direction. However, this description is imprecise as the direction of propagation is only a complete description for a plane wave with a specific polarization. In reality the beam coupled out of the waveguide has a finite extent. The beam could be for example a Gaussian beam, defined by the fact that the intensity distribution across the beam cross-section is Gaussian. The intensity distribution of light along the beam cross-section is referred to as the emission profile.

According to the present disclosure, the problem of inefficient coupling around a right angle is suppressed by introducing a cavity in the horizontal direction, for example by adding a defect inside the grating coupler, or by adding a reflective element to the waveguide outside the grating coupler. When a defect is added inside the grating coupler, the emission profile can also be tailored by tailoring the shape of the defect mode (the mode profile).

In other words, in the coupling mechanism according to the present disclosure, the resonant mechanism occurs in the direction of the waveguide, i.e., the in-plane direction. This resonant enhancement can be implemented by introducing a defect inside the grating coupler or by adding a reflective element that is external to the grating coupler but also defined in the waveguide. Both cases have in common that the resonant enhancement is achieved with a horizontal geometry and does not necessitate a top reflector.

A second novel aspect of this disclosure is that the same grating coupler can be used to both couple light from a laser source into a waveguide and to control the polarization of the laser source.

Furthermore, the applicants describe how the novel resonant enhancement can be used in combination with existing techniques such as focusing grating couplers, polarization splitting grating couplers, or the addition of a single reflector in the vertical direction. In the latter case the reflector in the vertical direction has a different function. It bears no relationship to the fact that the coupling angle is ninety degrees but enhances the grating coupler efficiency in different ways that rely on techniques that are different from the resonant enhancement. These other techniques have been described elsewhere in U.S. Pub. App. No. 2004/0156590 and U.S. Pub. App. No. 2004/0184156.

Reference is also made to the the paper by J. Witzens, A. Scherer, G. Pickrell, D. Louderback, and P. Guilfoyle, "Monolithic integration of vertical-cavity surface-emitting lasers with in-plane waveguides", Appl. Phys. Lett. 86, 101105 (2005) incorporated herein by reference in its entirety.

DETAILED DESCRIPTION

Figure 1:
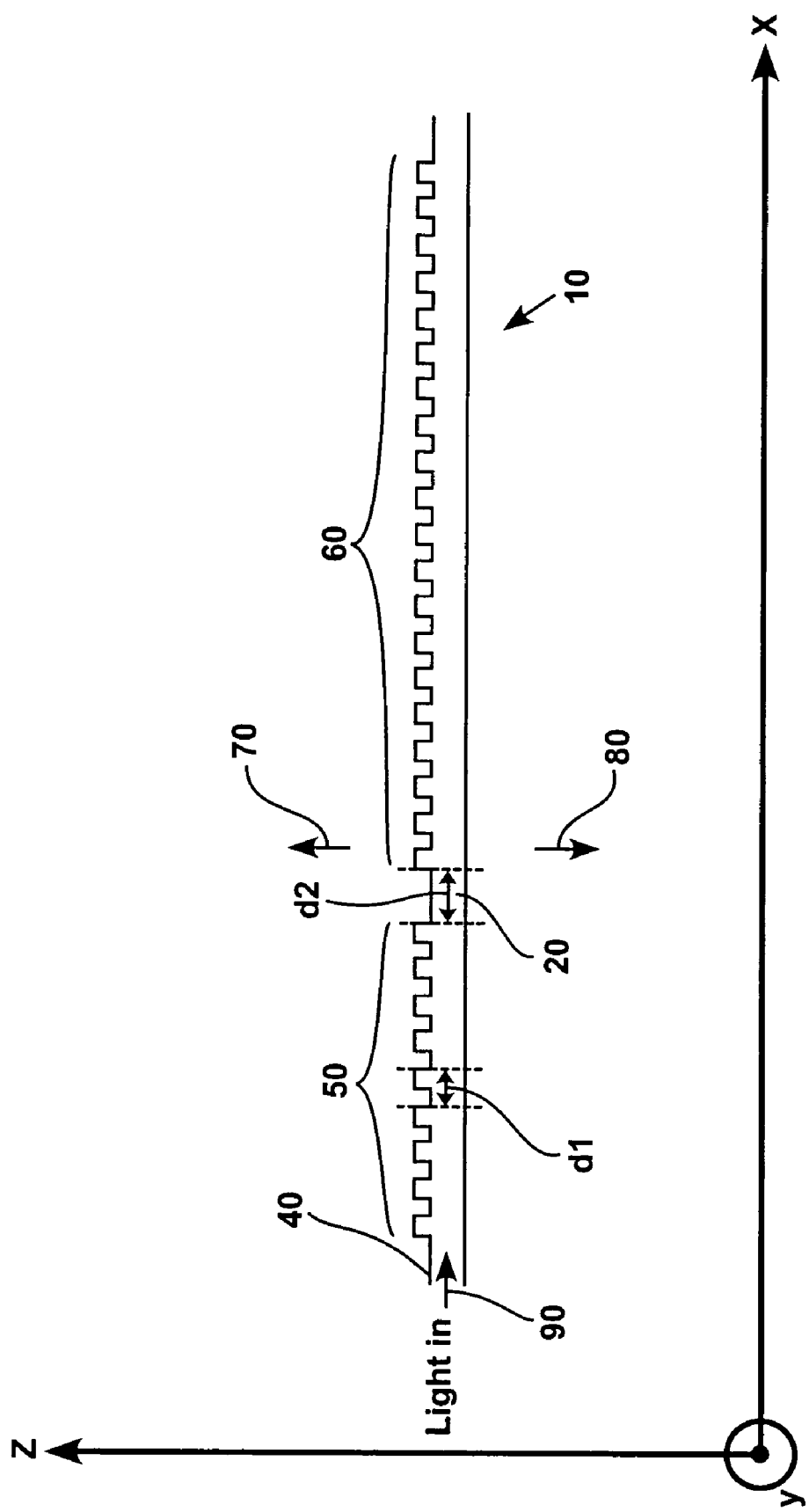
FIG. 1 shows a first embodiment of a grating coupler with a defect mode for improving efficiency.

FIG. 1 discloses a cross sectional view of an exemplary embodiment of a coupler 10 with a defect 20 for an improved extraction of light around a right angle.

Referring to FIG. 1, light comes in to the coupler 10 from a waveguide 40 and is extracted up and down in the Z direction with a 90 degrees angle, as shown by arrows 70 and 80.

Grates 50 are located before the defect 20 and grates 60 are located after the defect 20. The distance d1 between each grate of the grates 50 and each grate of the grates 60 corresponds to the Bragg condition for 90 degrees light extraction. In the embodiment shown in FIG. 1, the defect corresponds to a distance d2 between the last grate of the grates 50 and the first grate of the grates 60 which is different from the distance d1. The distance d2 introduced in accordance with the present disclosure depends on the profile of the extracted light and could be varied in accordance with the different uses of the coupler. For example, d2 could correspond to a 180 degrees phase shift to extract a TE mode (E-field along y) into a single lobe far-field or 360 degrees to extract a TE mode into a field with and odd E field symmetry, and so on. Similar considerations apply to the extraction of TM modes, which can be extracted by modifying distances d1 and d2.

The coupler 10 can be used both to couple light out of the waveguide 40 (as shown by arrows 70, 80 and 90) or into the waveguide 40 (reverse the arrows 70, 80 and 90). When light is coupled out of the waveguide 40 or into the waveguide 40, the number N2 of grates 60 is large and the number N1 of grates 50 is chosen so as to optimize the coupling efficiency. Specifically, N1 can be chosen to minimize back-reflections into the waveguide. For example, N1=9 and N2=20, as shown in the Figure. When light is supposed to be transferred from free space into both sides of the waveguide with equal magnitude the number of grates on both sides of the grating is equal, i.e., N1=N2. Intermediate cases are also possible.

The coupler 10 may be adapted with various kinds of waveguides such as slab waveguide or ridge waveguides. The grates 50 and 60 may also take multiple forms such as trenches or rows of holes, as long as the Bragg condition for normal extraction is satisfied. The person skilled in the art will also understand that grates 50 and 60 can also be above the waveguide, below the waveguide or at different positions inside the waveguide, as long as they have a finite spatial overlap with the waveguide mode. Trenches or rows of holes are discussed, as such, in U.S. Pub. App. No. 2004/0156590 or U.S. Pub. App. No. 2004/0184156, which is incorporated herein by reference in its entirety.

The embodiment shown in FIG. 1 could be, for example, a resonantly enhanced grating coupler defined in a slab waveguide (with straight grates and no focusing effect), a resonantly enhanced grating coupler focusing into a rectangular waveguide or a resonantly enhanced grating coupler focusing into a ridge waveguide. Whether a waveguide would be a ridge waveguide or a rectangular waveguide is determined by the waveguide cross-section perpendicular to the direction of the propagation of waveguide modes, while the cross-section represented in FIG. 1 is along the direction of propagation. The waveguide could be, for example, a dielectric waveguide or a metallic waveguide.

Figure 2:
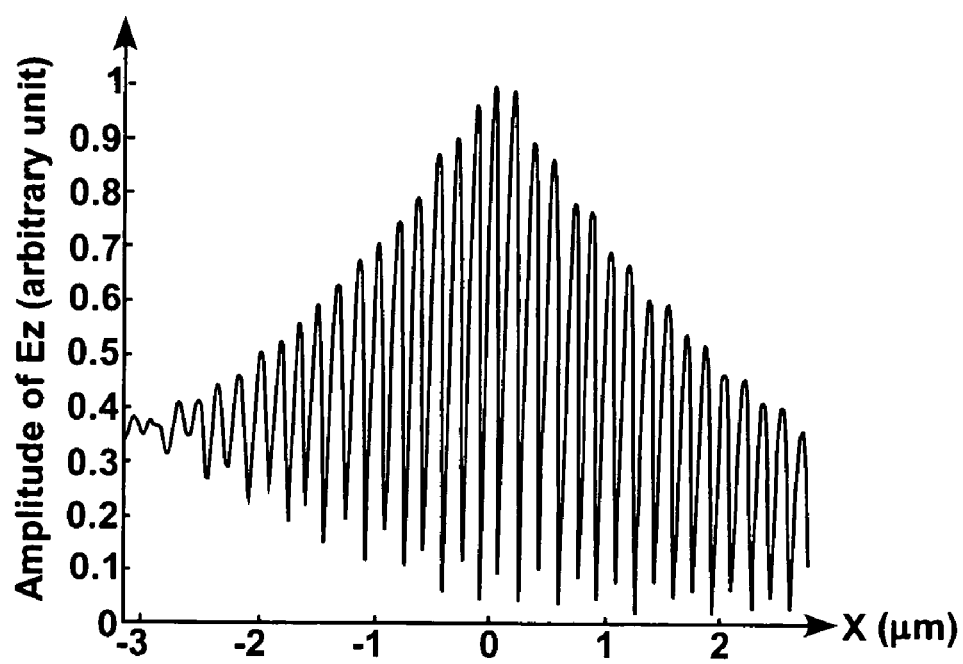
FIG. 2 shows the spatial dependence of the E-field inside the grating coupler of FIG. 1.

FIG. 2 shows the spatial dependence of the E-field inside the grating coupler of FIG. 1, where x=0 corresponds to the position of the defect 20 of FIG. 1. The E-field has a maximum at the position of the defect 20.

Figure 3:
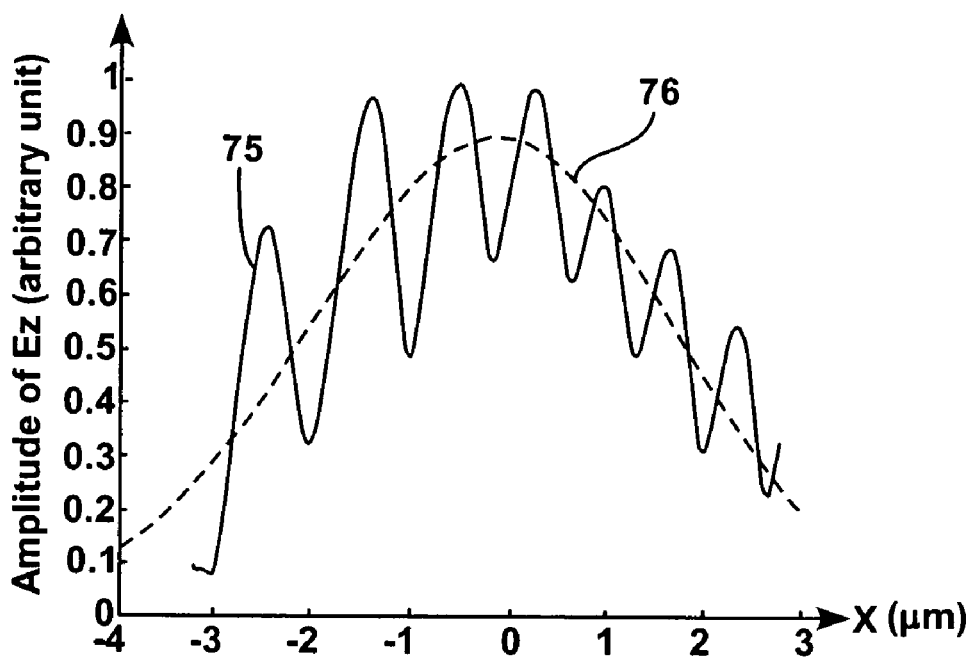
FIG. 3 shows the spatial dependence of beam 70 of FIG. 1.

FIG. 3 shows the spatial dependence of beam 70 (see FIG. 1) that is propagating vertically (continuous curve 75). The dashed curve 76 shows a Gaussian. It can be noted that the emitted field is close to a Gaussian.

Figure 4:
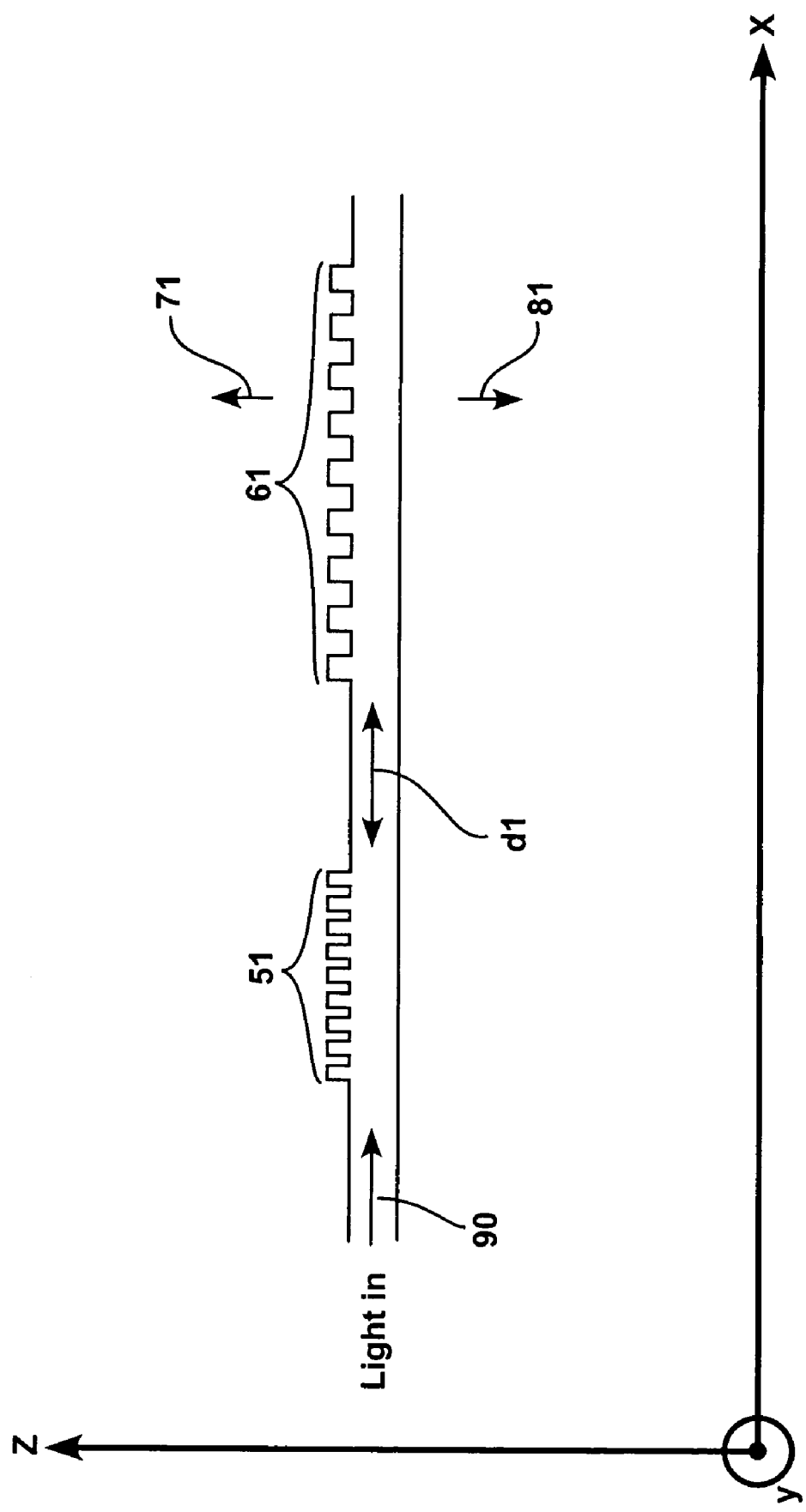
FIG. 4 shows a second embodiment, where a reflective element is added to the waveguide externally of the grating coupler.

FIG. 4 shows an embodiment similar to the one shown in FIG. 1, where the left grating 51 has a periodicity which is different from the right grating 61. In the embodiment of FIG. 4, both gratings are etched in the waveguide. For example, grating 51 has a periodicity of half of grating 61. Grating 51 is functionally equivalent to a reflective element and induces back-reflection but no out-of-plane coupling. If grating 61 is used on its own, it couples right out-of-plane at a right angle, but also induces back reflections. If grating 51 is added at a distance d1, gratings 51 and 61 define a cavity for the same wavelength. Preferably, the distance between gratings 51 and 61 is an integer number of half wavelengths, $$m \cdot \frac{n\lambda}{2},$$

where m is an integer. If the number of grates grates 51 is chosen correctly, there are no back-reflected waves left of 51, so that all the incoming light 90 is eventually coupled up or down of grating 61 along arrows 71, 81. Therefore, in accordance with the embodiment of FIG. 4, variation of the pitch of the first set of grates and of the distance d1 allows suppression of back-reflections. In other words, the grating coupler 61 and the reflective element 51 form a cavity that suppresses the back-reflections induced by the grating coupler. Additionally, the grate strength inside 61 can be varied to provide a mechanism to tailor the emission profile.

Figure 5:
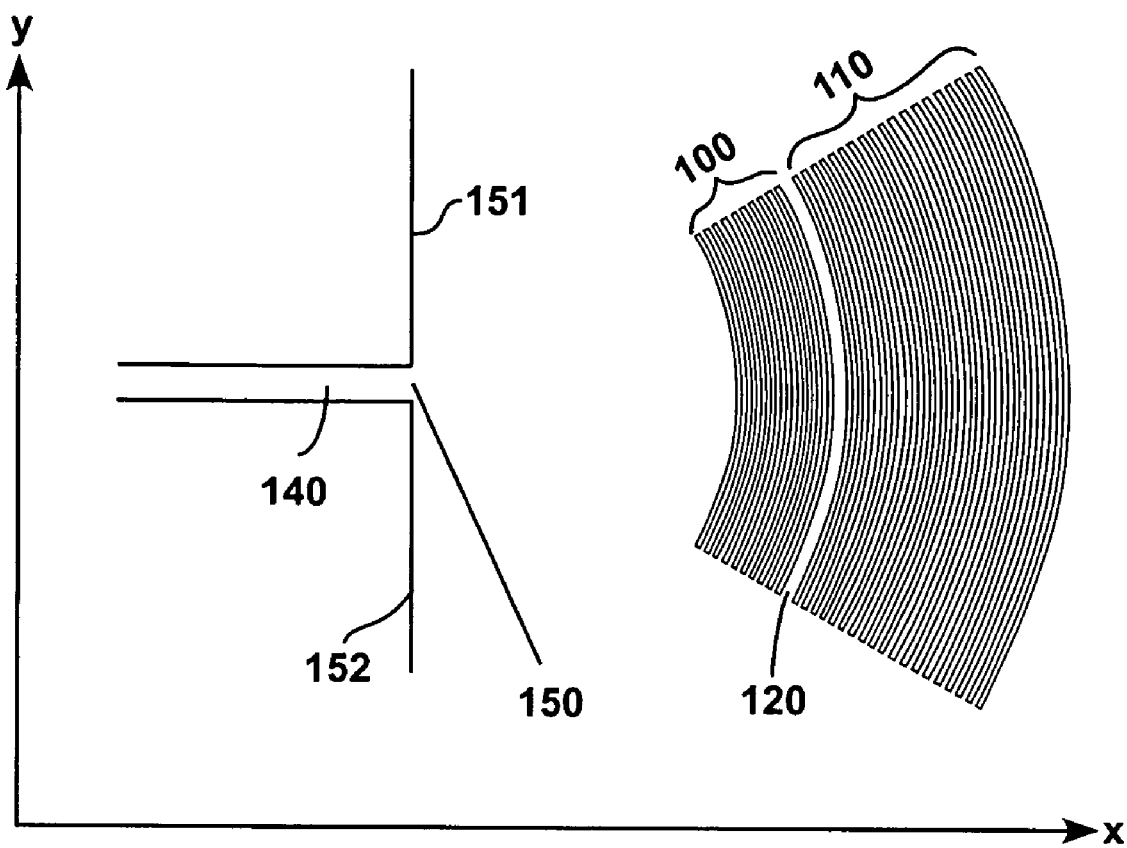
FIG. 5 shows a further embodiment of a grating coupler with a defect mode for improving efficiency, where the grates are curved to achieve in-plane focusing.

FIG. 5 shows a view from the top of a further embodiment of the coupler in accordance with the present disclosure. The coupler 130 of FIG. 5 comprises a waveguide 140 having a thin aperture 150, together with grates 100 and 110, separated by a defect 120. Also in this case, the defect is a distance between the grates. The number and shape of grates 100 and 110 of the coupler 130 may be varied so as to tailor the profile of the defect 120 and to optimize the coupling to a specific free-space field profile.

By bending the grates 100 and 110 and transforming them into ellipses with a focal point 150 (i.e., a focal point coinciding with the aperture of the waveguide, centered relative to the waveguide cross-section) as shown in FIG. 5, the grating coupler 130 will focus into the thin aperture waveguide 140. For example, in order to obtain a 90 degrees angle extraction of light, grates 100 and 110 could be shaped as concentric circles (i.e., ellipses having eccentricity=1) centered on the end of the waveguide at point 150. In case a different angle of extraction is needed, the grates will be shaped as ellipses having a different eccentricity. The distance between the end of the waveguide 140 and the defect 120 is chosen so that the beam expansion between the end of the waveguide and the defect yields the targeted free-space field size in the Y direction.

The space between point 150 and grates 100 is filled, for example, by a slab waveguide. For example, at point 150 the waveguide 140 ends and a slab waveguide starts. In other words, the L-shaped contours 151, 152 above and below the waveguide 140 delimit a region where thin film has been etched away, while in the region of the slab waveguide between 150 and 100 the film has not been etched. A complete etch of the thin film in which the waveguide is defined would result in 140 to be a rectangular waveguide, while a partial etch would result in 140 to be a ridge waveguide.

Figure 6:
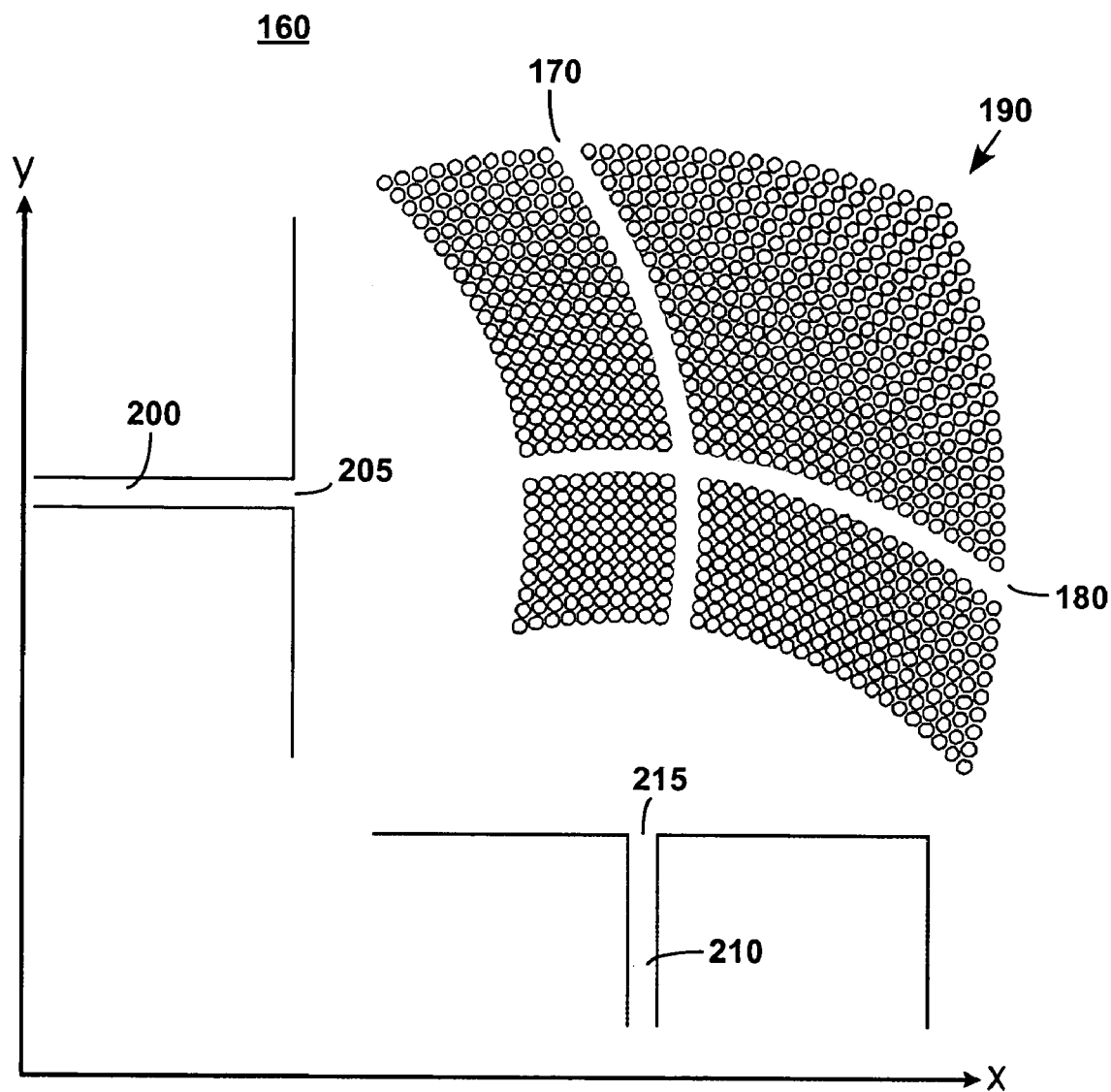
FIGS. 6 and 7 show a further embodiment of a resonantly enhanced grating coupler as a polarization splitting grating coupler with a dual defect mode.

FIG. 6 shows a further embodiment of the coupler in accordance with the present disclosure. In particular, a combination of a resonantly enhanced grating coupler with a focusing polarization splitting grating coupler is shown. The coupler 160 of FIG. 6 comprises a first waveguide 200 with an aperture 205 and a second waveguide 210 with an aperture 215, together with an array 190 of grates or scatterers (e.g., holes), the array containing a 'column' defect 170 and a 'row' defect 180. The person skilled in the art will understand that the terms row defect and column defect do not necessarily mean defects having a direction parallel to the x and y axes, respectively. For example, in the embodiment shown in FIG. 6, one type of defect has a direction which prevalent along one of the two axes, and the other type of defect has a direction which is prevalent along the other of the two axes.

The embodiment shown in FIG. 6 allows polarization splitting to be obtained. In particular, the light incoming from above or below the grating coupler can have one of two preferential polarizations p1 and p2, or can have another polarization that corresponds to a superposition of p1 and of p2. If the polarization is p1, light gets coupled into one of the waveguides (e.g., 200). If the polarization is p2, light gets coupled into the other waveguide (e.g., 210). If light corresponds to a superposition of p1 and p2, it is decomposed into p1 and p2 and each of the components is coupled to the corresponding waveguide 200, 210.

Similarly to what is shown in FIG. 5, the position of the apertures 205, 215 preferably coincides with the focal points of the ellipses forming the grating matrix 190, in order to increase efficiency.

A polarization splitting coupler usually comprises a square lattice of scatterers. The resonant enhancement is achieved, in accordance with the present disclosure, by introducing a defect into the polarization splitting grating coupler. Such a defect can be defined by introducing line defects 170, 180 such as in FIG. 6, but also by locally displacing some scatterers or a combination of the above.

Figure 7:
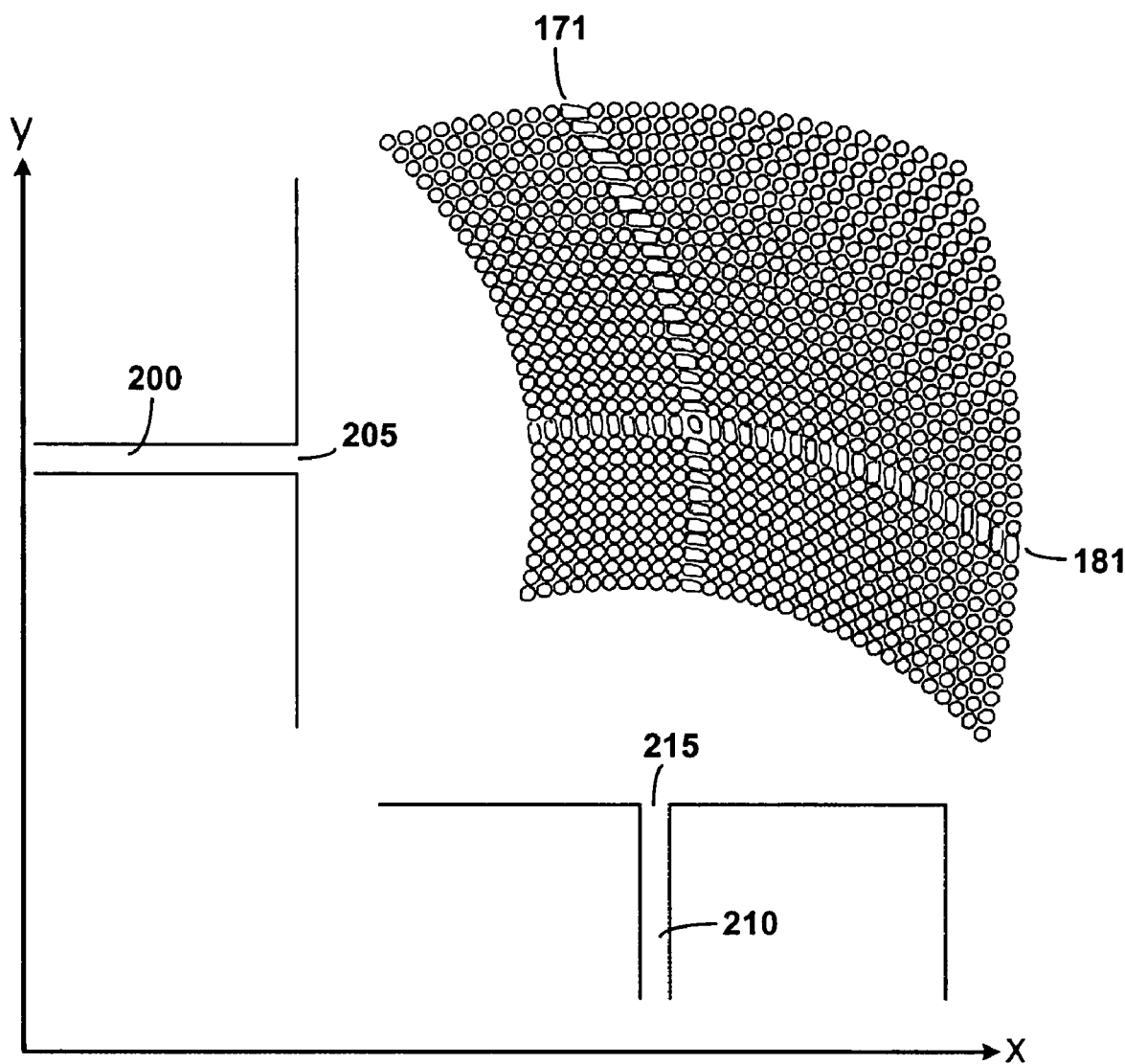

Alternatively, instead of introducing a displacement in the hole position, the scatterers themselves could be deformed along 171 and 181, as shown in FIG. 7, or they could be deformed and displaced. FIG. 7 represents an embodiment using fractional edge dislocation, i.e., elongated holes. Fractional edge dislocation is mentioned, as such, in "Design of photonic crystal microcavities for cavity QED", J. Vuckovic, M. Loncar, H. Mabuchi, A. Scherer, Phys. Rev. E 65, 016608.

Figure 8:
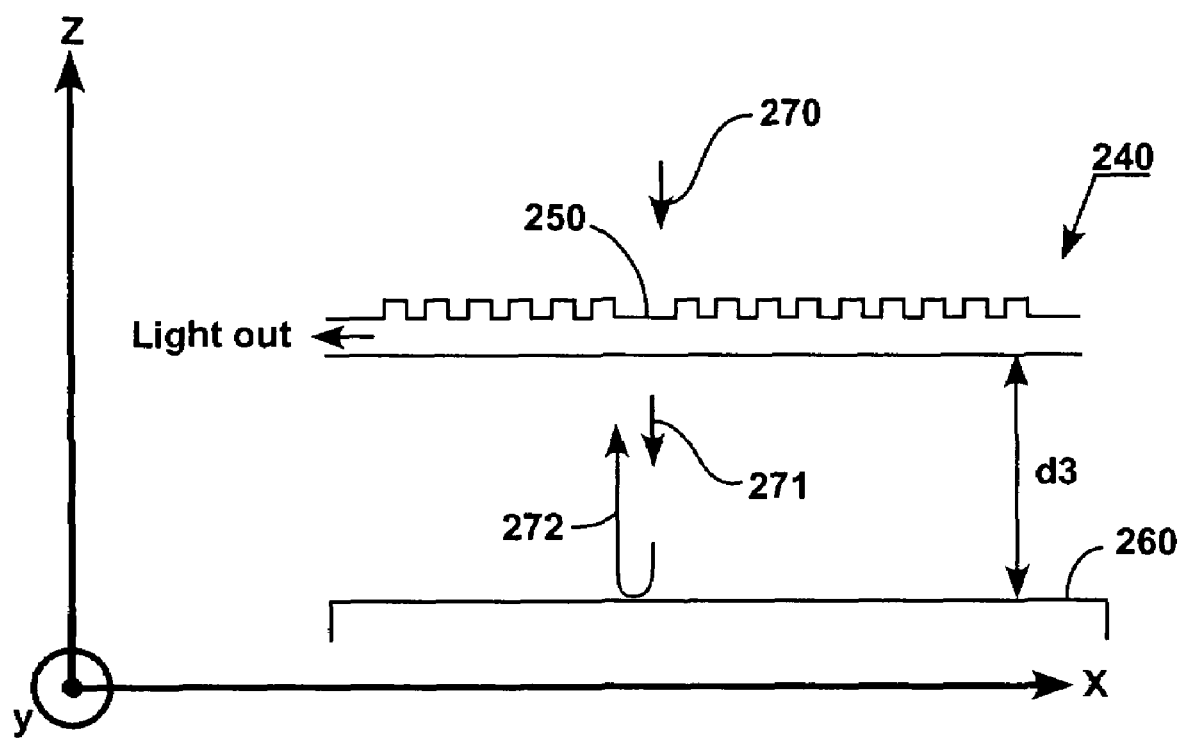
FIG. 8 shows the grating coupler of FIG. 1 with an additional reflective element in the vertical direction.

FIG. 8 is a cross-sectional view showing another embodiment of a coupler 240 comprising a defect 250 and a reflective enhancing element or mirror 260 such as, for example, a multilayered stack, which may be positioned above (not shown) or below the coupler 240, as shown in the figure.

A multilayered stack is a stack of thin films with an optical width of a quarter wavelength, that acts as a reflector. In the embodiment previously shown in FIG. 1, light could be coupled both up and down the waveguide, i.e., both into the waveguide and outside the waveguide. If the goal is to couple only light up, a reflector like element 260 can be used to recycle the light 271 initially coupled down. In particular, because a grating coupler without feedback reflector 260 couples from the waveguide to both +z and −z, light is lost if it is only collected at +z. Thus the utility of the reflector 260.

In particular, FIG. 8 shows a free-space light beam 270, 271 transmitted from the +z direction, with a reflective element 260 (for example a mirror) positioned in the −z direction to reflect back the power transmitted through the grating. According to the present disclosure, a phase of the reflection 272 incoming onto the coupler 240 from the −z direction and the phase of the incoming field from +z may be linked by controlling a distance d3 between the reflective element 260 and the coupler 240. The relative phase between 272 and 270 that optimizes the coupling efficiency can be obtained by complex conjugating the phase of 70 and 80 in FIG. 1. The phases of 70 and 80 can be obtained by simulating the structure shown in FIG. 1 with numerical methods such as the finite-difference time-domain method.

Figure 9:
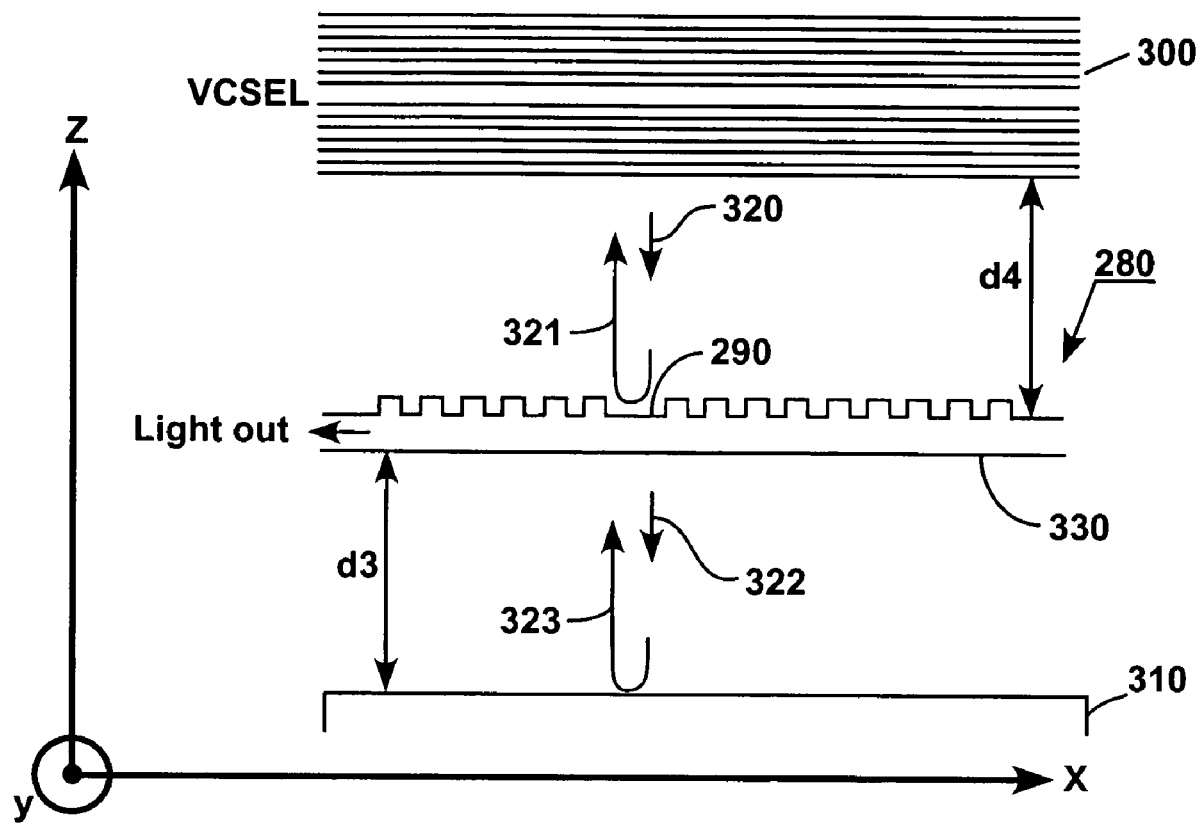
FIG. 9 shows the grating coupler of FIG. 1 with a laser source.

FIG. 9 is a cross-sectional view disclosing another exemplary embodiment of a coupler 280 comprising a defect 290 and a laser source 300 such as, for example, a vertical cavity surface-emitting laser (VCSEL). The coupler further comprises a mirror or reflective element 310 such as, for example, a multilayered dielectric stack, which may be positioned below the coupler 280. The mirror 310 of FIG. 9 is functionally identical to the mirror 260 shown in FIG. 8.

Polarization of the incoming light 320, generated by the laser source 300, may be controlled by varying the distance d4 between the laser source 300 and the coupler 280.

Because coupler 280 reflects some power back into the +z direction towards the laser source 300, with a polarization dependent phase and intensity, polarization dependent feedback towards the VCSEL 300 is achieved. This provides polarization control.

FIG. 9 is a combination of the reflector 260 of FIG. 8 (310 in FIG. 9) and of the feedback to the VCSEL. The embodiment of FIG. 9 might be particularly important in the context of optical clocking. For example, a III-V chip with VCSELs could be a flip-chip bonded on a silicon-on-insulator (SOI) chip. For example, the grating coupler is etched in the topmost silicon layer of the SOI. The $SiO_2$-silicon interface between the handle of the wafer (bulk silicon at the bottom of the structure) and the buried oxide acts as the reflector 310. The thickness of the buried oxide acts as the distance d3.

Referring to FIG. 9, if, for example, the waveguiding layer 330 is $$\frac{n\lambda}{2}$$

thick (where $\lambda$ is the free-space wavelength and n the refractive index of the waveguiding layer 330) there are almost no reflections for the non-coupled polarization, but strong reflections for the polarization that is coupled by the coupler 280. In this way, the quality factor of the coupled polarization in the cavity of the laser 300 cavity may be enhanced, to control the polarization of the laser 300 emission.

In other words, the strength of reflection 321 depends on the polarization of the light. In the embodiment of FIG. 9, 321 is significantly stronger for the coupled polarization and the distance d4 is chosen so that the feedback to the laser 300 is constructive for the coupled polarization. Thus polarization control of the laser 300 is achieved so that it preferentially lazes in the coupled polarization.

The above situation can be inversed when the reflector 310 is added to the system. The function of the reflector 310 is to maximize the overall efficiency of the light 320 coming from the laser 300 to "light out" coupling so that reflections 321 are suppressed for the coupled polarization when distance d3 is optimized. If the reflections 321 of the non-coupled light are stronger, distance d4 is chosen to introduce a negative feedback to the laser for the non-coupled polarization, so that again again the laser lazes preferentially in the coupled polarization.

Figure 10:
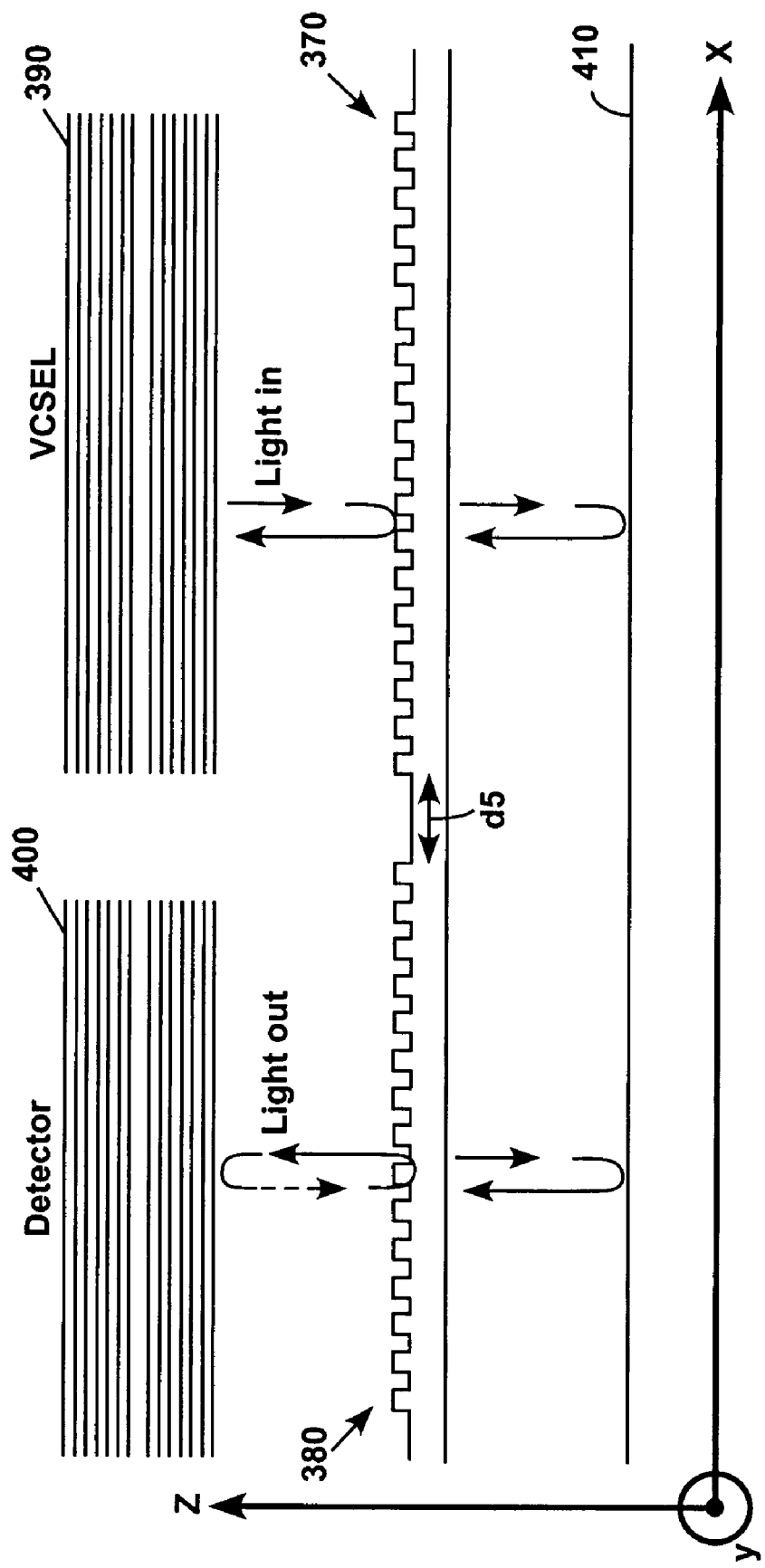
FIG. 10 shows a further embodiment of the present disclosure, with a laser sources and a detector.

FIG. 10 shows a cross-sectional view of a further embodiment of the present disclosure. FIG. 10 is similar to FIG. 9 in that elements in the vertical direction are present. These elements comprise a VCSEL 390, a detector 400 and a reflector 410. However, FIG. 10 is different from FIG. 9 in that the resonant mechanism for each of the two grating couplers 370, 380 is provided by reflections from the other grating coupler. It should be noted that the distance d5 between gratings 370 and 380 is usually much larger than the distance d2 of the previous embodiments.

FIG. 10 depicts how to transport light between device 390 and device 400. The distance d5 between the diffraction gratings 370 and 380 is usually constrained to be $$m \cdot \frac{n\lambda}{2},$$

where m is an integer and n is the effective index of the waveguide, in order to obtain a resonance for the wavelength that gets vertically extracted by the grating couplers. However, within that constraint it can be tailored to specific engineering applications.

In accordance with the embodiment of FIG. 10, the distance d5 is smaller than or of the order of the coherence length of the waveguide (limited by fabrication tolerance) defined as the length over which the accumulated phase due to light propagation through the waveguide is still predictable. However, there are applications where d5 might be longer than the coherence length of the waveguide. If d5 is longer than the coherence length, random variations in the waveguide geometry introduce a random phase. In that case, reflections from grating coupler 370 to grating coupler 380 cannot be used to produce the resonant enhancement, so that the defect d2 of the previous embodiments should be reintroduced into each of the grating couplers 370, 380. In most cases, reintroduction of the defect d2 might also be preferred, due to additional tailoring of the emission profiles.

The person skilled in the art will understand that the lasers shown in the various embodiments are just a preferred embodiments of light sources, and that any kind of light source could be used. However, it should be noted that the resonant mechanism has a relatively thin pass-band, so that laser sources are highly preferred.

It might be useful to have the VCSEL 400 and the detector 420 coupled therewith on a same flip-chip bonded III-V chip. Vertical cavity lasers are particularly suitable for a geometry where lasers 390, 400 and detector 420 are on the same chip, so that alignment could be done in a single step.

An additional embodiment in accordance with the present disclosure provides for addition of a resonant mechanism in a grating coupler where the grate strength is varied to tailor the emission profile. Variation of the grate strength is described in S. Miyanaga, and T. Asakura, "Intensity profile of outgoing beams from uniform and linearly tapered grating couplers", Appl. Opt. 20, 688-695 (1981) and K. A. Bates, L. Li, R. L. Roncone, and J. J. Burke, "Gaussian beams from variable groove depth grating couplers in planar waveguides", Appl. Opt. 32, 2112-2116 (1993). Those papers are incorporated herein by reference in their entirety. Variation of the grate strength as disclosed in those publications allows a better control of the emission profile to be obtained. However, such feature alone is not suitable for a 90 degrees change of direction, because back-reflections into the waveguide need to be suppressed. Therefore, the applicants have introduced, in accordance with this embodiment, a resonant mechanism in the grating coupler to enhance the efficiency of the grating coupler for 90 degrees bending of light. Optionally, tailoring of the emission profile can also be provided if the resonant mechanism relies on a defect.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A grating coupler comprising:
   a first waveguide having an axis, wherein the first waveguide guides light in a direction parallel to the axis of the waveguide; and
   a first grating associated with the waveguide, the first grating comprising a first plurality of grates and a second plurality of grates separated by a first distance from the first plurality of grates, said first distance being controllable in accordance with a profile of light to be input into the waveguide or extracted from the waveguide,
   wherein the first plurality of grates, the second plurality of grates and the first distance are selected so that at least one between the first plurality of grates and the second plurality of grates acts both as a reflective element and a coupler,
   wherein the reflective element is such that light parallel to the axis of the waveguide is reflected in a direction parallel to the axis, and
   wherein the grates are curved grates.

2. The grating coupler of claim 1, wherein the curved grates have a substantially circular shape.

3. The grating coupler of claim 1, wherein the curved grates have a substantially elliptical shape.

4. The grating coupler of claim 3, wherein a distance between the grates and the waveguide corresponds to a focal point of the ellipsis.

5. A grating coupler comprising:
   a first waveguide having an axis, wherein the first waveguide guides light in a direction parallel to the axis of the waveguide; and
   a first grating associated with the waveguide, the first grating comprising a first plurality of grates and a second plurality of grates separated by a first distance from the first plurality of grates, said first distance being controllable in accordance with a profile of light to be input into the waveguide or extracted from the waveguide,
   wherein the first plurality of grates, the second plurality of grates and the first distance are selected so that at least one between the first plurality of grates and the second plurality of grates acts both as a reflective element and a coupler,
   wherein the reflective element is such that light parallel to the axis of the waveguide is reflected in a direction parallel to the axis,
   wherein grates of the first plurality of grates are equidistanced therebetween and grates of the second plurality of grates are equidistanced therebetween, and wherein a distance between grates of the first plurality of grates is different from a distance between grates of the second plurality of grates, and
   wherein the distance between grates of the first plurality of grates is half the distance between grates of the second plurality of grates.

6. A grating coupler comprising:
   a first waveguide having an axis, wherein the first waveguide guides light in a direction parallel to the axis of the waveguide; and
   a first grating associated with the waveguide, the first grating comprising a first plurality of grates and a second plurality of grates separated by a first distance from the first plurality of grates, said first distance being controllable in accordance with a profile of light to be input into the waveguide or extracted from the waveguide,
   wherein the first plurality of grates, the second plurality of grates and the first distance are selected so that at least one between the first plurality of grates and the second plurality of grates acts both as a reflective element and a coupler, and
   wherein the reflective element is such that light parallel to the axis of the waveguide is reflected in a direction parallel to the axis, the grating coupler The grating coupler of claim 1, further comprising:
   a second waveguide;
   a second grating associated with the second waveguide, the second grating comprising a third plurality of grates and a fourth plurality of grates separated by a second distance from the third plurality of grates;
   wherein light incoming from a first direction is coupled in a second direction in either the first waveguide or the second waveguide, the grating coupler being a polarization splitting grating coupler.

7. The polarization splitting grating coupler of claim 6, wherein the first direction is a vertical direction and the second direction is a horizontal direction.

8. An arrangement comprising:
   a waveguide having an axis, wherein the first waveguide guides light in a direction parallel to the axis of the waveguide;
   a first grating formed in the waveguide, the first grating having a first periodicity, the waveguide and the first grating forming a first reflective element; and
   a second grating formed in the waveguide, the second grating having a second periodicity, the waveguide and the second grating forming a second reflective element, the first reflective element and the second reflective element forming an optical resonator,
   wherein at least one between the first grating and second grating couples light to or from the waveguide in a direction not parallel to the axis of the waveguide,
   wherein at least one between the first reflective element and the second reflective element is a distributed Bragg reflector, and wherein the second periodicity is half the first periodicity.

9. A method to increase efficiency of a grating coupler comprising:
   providing a first grating coupler with a grating coupler periodicity;
   providing a resonant mechanism; and
   combining the first grating coupler with the resonant mechanism in a waveguide having an axis, wherein: the waveguide guides light in a direction parallel to the axis of the waveguide and the first grating coupler couples light to or from the waveguide in a direction not parallel to the axis of the waveguide, wherein the resonant mechanism is a defect inside the first grating coupler.

10. A method to increase efficiency of a grating coupler comprising:

provcding a first grating coupler with a grating coupler periodicity, providing a resonant mechanism; and combining the first grating coupler with the resonant mechanism in a waveguide having an axis, wherein: the waveguide guides light in a direction parallel to the axis of the waveguide and the first grating coupler couples light to or from the waveguide in a direction not parallel to the axis of the waveguide, and wherein the resonant mechanism is a distributed Bragg reflector having a reflector periodicity which is half the first grating coupler periodicity.

* * * * *